Feb. 12, 1952                A. B. DEMBER                2,584,989
DEW POINT MEASURING APPARATUS
Filed March 20, 1947
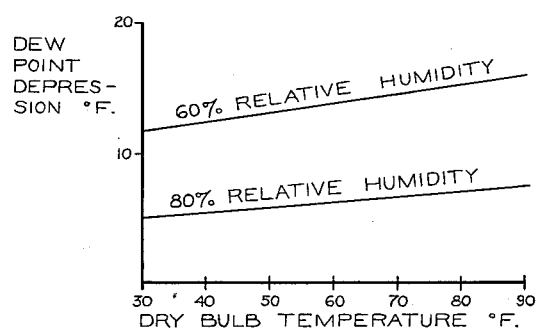
FIG. 1
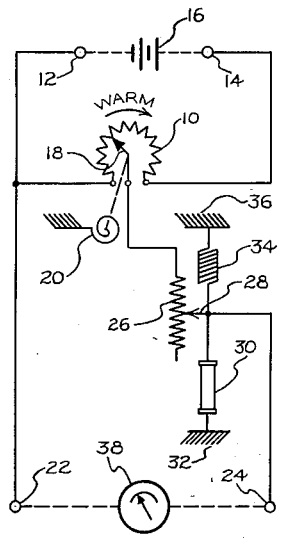
FIG. 2
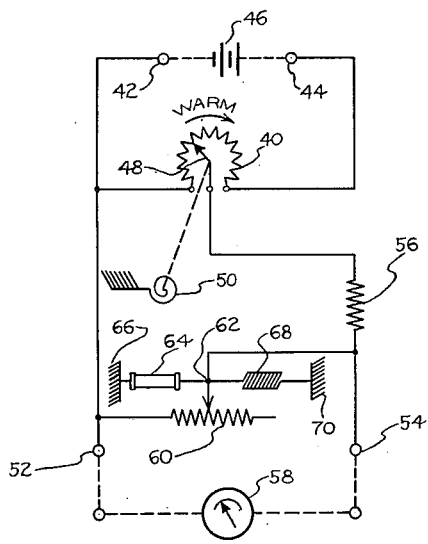
FIG. 3
FIG. 4
Inventor
ALEXIS B. DEMBER
By George V. Ettgroth
      Agent Patented Feb. 12, 1952

2,584,989

UNITED STATES PATENT OFFICE 2,584,989

DEW POINT MEASURING APPARATUS

Alexis B. Dember, Towson, Md., assignor to Bendix Aviation Corporation, Baltimore, Md., a corporation of Delaware Application March 20, 1947, Serial No. 735,881

3 Claims. (Cl. 73—17)

This invention relates to humidity responsive measuring apparatus and, more particularly, to apparatus of this class in which provision is made for the registration or indication of dew point temperatures. This disclosure is a continuation in part of my copending application filed of even date herewith.

The dew point is defined as that temperature at which the air under investigation is saturated with water vapor. It is conventionally determined by chilling a polished metal surface to the temperature at which a cloudy film of condensation first appears. As conventionally performed, this is a discontinuous process giving readings spaced at discrete time intervals. Other setups for the continuous measurement of the dew point have been devised relying upon the photoelectrically controlled circulation of a cooling medium thermally associated with a mirror-like surface. The photoelectric system is energized by light reflected from the polished condensing surface, and acts to interrupt the supply of coolant when the first evidences of condensation impair the reflection properties of the test surface. It is obvious that such a system is expensive because of the requirement for control apparatus, inconvenient because of the necessity for a supply of coolant, and somewhat inaccurate because of the fact that the reflecting surface swings above and below the dew point as a result of the control operation.

Accordingly, it is a primary object of this invention to provide new and novel dew point indicating apparatus.

A further object of the invention is to provide new and novel dew point indicating apparatus delivering continuous indications.

Yet another object of the invention is to provide new and novel dew point indicating apparatus dispensing with the necessity for chilling a test surface.

Still another object of the invention is to provide new and novel dew point responsive apparatus operating without expensive and complicated follow-up control systems.

Other objects and advantages of the invention will in part be described and in part be obvious when the following specification is read in conjunction with the drawings in which:

Fig. 1 is a graph illustrating the variation of the dew point depression at various relative humidities for a change in dry bulb temperature;

Fig. 2 illustrates schematically a dew point measuring system incorporating the essentials of the invention, and Fig. 3 illustrates schematically an alternative form of a dew point measuring system.

Fig. 4 illustrates a dew point measuring system which has no moving parts.

From the graph of Fig. 1 it is noted that the dew point depression below the dry bulb temperature is a function of the relative humidity, and of the dry bulb temperature, increasing with decrease in relative humidity and with an increase in dry bulb temperature. The data on which these curves are based appear in the Smithsonian meteorological tables and the Bulkeley chart prepared by the American Society of Heating and Ventilating Engineers. From the data of Fig. 1 it will be understood that the dew point may be derived by determining the dry bulb temperature and thereafter subtracting a value determined by the dry bulb temperature and by the relative humidity.

The apparatus of Fig. 2 is adapted to provide indications responsive to dry bulb temperatures which are corrected to indicate dew point temperatures by means of a humidity controlled variable resistor. The resistance element 10 of a potentiometer is connected between input terminals 12 and 14 adapted for connection with a source of electric energy 16. An arm 18 is movable over and in engagement with the resistance element 10 under the influence of a bimetal unit 20 which coils and uncoils with change in temperature, the bimetal motion being such as to drive the arm 18 clockwise in response to increases in temperature. One measuring terminal 22 is directly connected with input terminal 12 while the other measuring terminal 24 is connected with the movable arm 18 through a variable resistor 26. The position of the tap 28 on resistor 26 is controlled by a hair assembly 30 stretched between the tap 28 and a reference abutment 32 under the influence of a biasing spring 34 stretching between the same point and another abutment 36. Increases in humidity increase the length of the hair assembly permitting the tap 28 to move upward and decrease the impedance in the measuring circuit including measuring terminal 22, resistance element 10, arm 18, resistor 26, and measuring terminal 24. Indications are provided by a current sensitive device 38 having an impedance less than that presented by the other elements in the measuring circuit.

The tap 28 traverses only a portion of the resistor 26 so that a predetermined minimum portion thereof is maintained in the circuit at all times. When the ambient humidity is 100%, the hair element has its maximum extension and only the minimum predetermined resistance remains in the measuring circuit. When this condition obtains, the temperature controlled movement of the arm 18 produces a current flow through the current sensitive device 38 indicative of the dry bulb temperature. The dew point setback is inserted when the humidity falls below 100% as a result of the shortening of the hair element which moves the tap 28 downward to increase the resistance in the measuring circuit, thereby decreasing the current flowing through the terminals 22 and 24 to reduce the temperature reading to that of the dew point.

Fig. 3 illustrates a modified manner of providing similar results with a somewhat different relation between humidity and the displacement of the tap on the humidity controlled resistor. In this figure, an arcuate resistance element 40 is connected between input terminals 42 and 44 adapted for connection with a source of electric energy 46. An arm 48 is movable over and in engagement with the resistance element 40 under the influence of a temperature responsive coiled bimetal assembly 50. One measuring terminal 52 is connected directly with input terminal 42 while the other measuring terminal 54 is connected with the movable arm 48 by a fixed resistor 56. A humidity variable resistance assembly including a resistor 60 with a contact 62 movable thereover in response to changes in humidity is connected between the measuring terminals 52 and 54. The tap 62 is driven by a hair element 64 stretched between a reference abutment 66 and the tap 62 by a tension spring 68 connected with an abutment 70. As the humidity decreases, the hair element shortens, moving the tap 62 to the left decreasing the resistance in shunt with the measuring terminals 52 and 54. A current sensitive indicating device indicated at 58 may be connected between the measuring terminals 52 and 54 to record or indicate the dew point. The resistance of this current sensitive element is preferably less than that of the measuring circuit including resistor 56 and the active portion of the resistance element 40.

In the presence of 100% relative humidity the tap 62 is at its extreme right-hand position to provide minimum shunting action on the current sensitive indicator 58, and diminishing humidity moves the tap 62 to the left. The mode of operation of the apparatus is generally similar to that of the previously described circuit. In the presence of an increase in temperature, the bimetal assembly 50 drives the arm 48 clockwise to increase the current flowing through the current sensitive device 58. The indication thus delivered in the presence of 100% humidity is the dry bulb temperature. As the humidity is decreased, the necessary dew point depression is set in by virtue of the increasing shunting action provided by the tap 62 moving over the resistor 60. This shunting action reduces the reading by a constant percentage for a given displacement of the tap which is to say that the dew point depression set into the apparatus is larger the higher the indicated temperature.

A system devoid of moving elements is shown in Fig. 4 wherein the input terminals 70 and 72 are connected across the series combination of a temperature responsive resistor 74 having a fairly high negative resistance temperature coefficient, and a substantially constant resistor 76. The resistor 74 may be of the type described by Becker, Green and Pearson in Electrical Engineering, November 1946, published by the American Institute of Electrical Engineers, or may be prepared by firing a mixture of 50–60% ferric oxide with ball clay and titanium dioxide. A source of electric energy 78 is connected between input terminals 70 and 72 to energize the system. Dew point indications are derived from a current sensitive indicator 80 connected between measuring terminal 82 linked with the junction between temperature responsive resistor 74 and constant resistor 76 and measuring terminal 84, which is connected with input terminal 72, through a humidity responsive resistor 86, which may consist of a film of lithium chloride deposited upon a polystyrene base between spaced conducting electrodes.

In the presence of 100% relative humidity, the humidity responsive resistor 86 presents a predetermined minimum impedance. In the presence of this high humidity, increases in the ambient temperature decrease the resistance of resistor 74 to increase the voltage drop across constant resistor 76 and thereby increase the indication of the current sensitive device 80. Should the humidity drop below 100%, the dew point depression is set in because the increase in resistance of humidity responsive resistor 86 increases the resistance in the measuring circuit still further to diminish the current flowing through the current sensitive device 80, thereby reducing the indicated temperature to the dew point value.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalents of the claims are therefore intended to be embraced thereby.

What is claimed and desired to be secured by United States Letters Patent is:

1. In humidity responsive apparatus, a pair of current energizing terminals, a pair of measuring terminals, a temperature responsive resistor having a resistance decreasing with increase in temperature connected between said input terminals in series with a substantially constant resistor, and a circuit connecting said fixed resistor between said measuring terminals including means for reducing the flow of current between said measuring terminals in the presence of decreasing humidity.

2. In humidity responsive apparatus, a pair of input terminals, a pair of measuring terminals, a temperature responsive resistor having a resistance decreasing with increase in temperature connected between said input terminals in series with a substantially constant resistor, and a circuit including a humidity responsive resistor increasing in resistance with decrease in humidity connecting said measuring terminals with the end terminals of said constant resistor.

3. In dew point measuring apparatus, a source of electric energy, a first electrical circuit connected with said source of electric energy and including a temperature responsive resistor having its resistance decreasing with increase in dry bulb temperature in series with a substantially fixed resistor, and a second electrical circuit connected across said fixed resistor including electrical means for reducing the flow of current in said second circuit in the presence of decreasing humidity, said electrical means comprising a humidity responsive resistor increasing in resistance with a decrease in humidity, said second circuit also including an indicating device responsive to the value of current flowing in said second circuit.

ALEXIS B. DEMBER.

REFERENCES CITED

The following references are of record in the file of this patent:

UNITED STATES PATENTS

| Number | Name | Date |
| --- | --- | --- |
| 2,109,222 | Ryder | Feb. 22, 1938 |
| 2,250,712 | Johnson | July 29, 1941 |
| 2,349,860 | Hainer | May 30, 1944 |
| 2,412,782 | Palmer | Dec. 17, 1946 |

FOREIGN PATENTS

| Number | Country | Date |
| --- | --- | --- |
| 44,274 | France | Oct. 31, 1933 |